(12) United States Patent
Jensen

(10) Patent No.: US 6,741,698 B1
(45) Date of Patent: May 25, 2004

(54) CALL MANAGEMENT SYSTEM USING DYNAMIC THRESHOLD ADJUSTMENT

(75) Inventor: Roy A. Jensen, Westminster, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/492,513

(22) Filed: Jan. 27, 2000

(51) Int. Cl.[7] ................................................ H05Q 3/64
(52) U.S. Cl. .......................... 379/265.02; 379/265.11; 379/265.12; 379/265.13; 379/265.14; 379/266.03; 379/266.06
(58) Field of Search ................... 379/265.01, 265.02, 379/265.03, 265.04, 265.05, 265.06, 265.07, 265.08, 265.09, 265.1, 265.11, 265.12, 265.13, 265.14, 266.01, 266.02, 266.03, 266.04, 266.05, 266.06, 266.08, 266.09, 266.1, 309

(56) References Cited

U.S. PATENT DOCUMENTS

| | | | | |
|---|---|---|---|---|
| 5,206,903 A | | 4/1993 | Kohler et al. .............. 379/309 |
| 5,506,898 A | * | 4/1996 | Costantini et al. .......... 379/266 |
| 5,721,770 A | * | 2/1998 | Kohler ........................ 379/266 |
| 5,825,869 A | * | 10/1998 | Brooks et al. ............... 379/265 |
| 5,828,747 A | | 10/1998 | Fisher et al. ................ 379/309 |
| 5,903,641 A | * | 5/1999 | Tonisson .................... 379/266 |
| 5,905,793 A | | 5/1999 | Flockhart et al. ........... 379/266 |
| 5,982,873 A | | 11/1999 | Flockhart et al. ........... 379/266 |
| 6,061,347 A | * | 5/2000 | Hollatz et al. .............. 379/93.01 |
| 6,088,441 A | | 7/2000 | Flockhart et al. ........... 379/265 |
| 6,157,655 A | * | 12/2000 | Shtivelman ................. 379/309 |
| 6,163,607 A | | 12/2000 | Bogart et al. ............... 379/266 |
| 6,173,053 B1 | * | 1/2001 | Bogart et al. ............... 379/266 |
| 6,192,122 B1 | * | 2/2001 | Flockhart et al. ........... 379/266 |
| 6,353,667 B1 | * | 3/2002 | Foster et al. ............. 379/265.05 |
| 6,366,666 B2 | * | 4/2002 | Bengtson et al. ........ 379/265.06 |
| 6,389,400 B1 | * | 5/2002 | Bushey et al. ................. 705/7 |
| 6,424,709 B1 | * | 7/2002 | Doyle et al. ................ 379/265 |
| 6,434,230 B1 | * | 8/2002 | Gabriel ................... 379/265.01 |
| 6,535,600 B1 | | 3/2003 | Fisher et al. ........... 379/265.12 |

* cited by examiner

Primary Examiner—William J. Deane, Jr.
(74) Attorney, Agent, or Firm—Sheridan Ross P.C.

(57) ABSTRACT

A call center includes functionality for dynamically varying a threshold value associated with each of a number of different call types (i.e., skills) to be handled by the call center. A group of agents and a group of reserve agents are provided within the call center for use in handling incoming calls. A dedicated subgroup of agents is assigned to service each of the call types in the call center. In addition, one or more reserve agents are assigned to service a particular call type when an expected wait time associated with the call type exceeds a threshold value. The threshold value associated with each call type is dynamically adjusted during call center operation based on a measured service level being provided to a corresponding call type. In one embodiment, the threshold value for a call type is adjusted based on a comparison between a measured service level and a predetermined service level target associated with the call type.

38 Claims, 3 Drawing Sheets

CALL MANAGEMENT SYSTEM USING DYNAMIC THRESHOLD ADJUSTMENT

TECHNICAL FIELD

The invention relates generally to telephone call centers and, more particularly, to call management techniques for use in telephone call centers.

BACKGROUND OF THE INVENTION

A call center is a facility that handles telephone calls for an organization, usually using some level of computer control. Typically, the telephone calls handled by a call center are incoming calls from present or potential customers of the organization. The incoming calls are generally distributed among a number of agents within the call center who are each trained to handle certain types of incoming calls. A call center will normally be capable of handling many different types of calls coming into the organization. For example, a call center may be set up to receive calls relating to each of a multitude of different products, product types, or product families sold by the corresponding organization. Alternatively, or in addition, a call center may be arranged to handle calls relating to different services or information dissemination functions provided by the organization. Some such services/functions include: taking product orders, providing customer service, providing pricing and/or availability information, or any of a variety of other functions. The types of calls that are supported by a call center are commonly referred to as the "skills" of the call center.

It is often desirable that each of the different skills associated with a call center be handled differently by the call center. That is, some of the skills may be deemed by the corresponding organization to be more important than other skills and hence are to be given more attention or better service by the call center. Thus, a service level target is often defined for each of the different skills of the call center to indicate a desired level of service for the skill. However, past techniques for achieving the desired service levels for each of the skills of a call center have generally been inadequate. That is, actual performance levels for the different skills have not accurately reflected the desired service level targets defined for those skills.

Therefore, there is a need for a method and apparatus that is capable of accurately achieving desired service level targets for skills in a call center.

SUMMARY OF THE INVENTION

The present invention relates to a system for use in a call center that is capable of achieving predetermined service level targets for a plurality of call center skills to a relatively high degree of accuracy. The system uses a plurality of reserve agents that are not affiliated with any particular skill or skill set in the call center. That is, the reserve agents can each be assigned to any of the various skills of the call center based on current system conditions. Once assigned to a particular skill, a reserve agent then works in conjunction with the agents assigned to that skill to process calls for that skill. In a preferred embodiment, the system calculates an "expected wait time" for each new call received by the call center for a particular skill. The expected wait time represents an anticipated amount of time that the caller associated with the new call will have to wait before his call is addressed by call center personnel. When the expected wait time for a new call exceeds a threshold value associated with the skill, the system assigns a reserve agent to the skill to aid in the processing of calls for the skill, thus reducing the expected wait time for the skill.

In accordance with the present invention, the threshold value associated with a particular skill is dynamically adjusted during normal system operation based on a measured service level being provided to the skill. Preferably, the threshold value is varied in a manner that is designed to achieve the desired service level target for the skill. Thus, if the call center is achieving less than a desired service level for a particular skill, the corresponding threshold value is reduced and a reserve agent will be assigned to that skill more readily. Conversely, if the call center is achieving greater than the desired service level for the skill, the threshold value is increased and a reserve agent will be assigned to that skill less readily. In this manner, the system can achieve the desired service level targets for each of the skills of the call center to a relatively high degree of accuracy.

DETAILED DESCRIPTION

Figure 1:
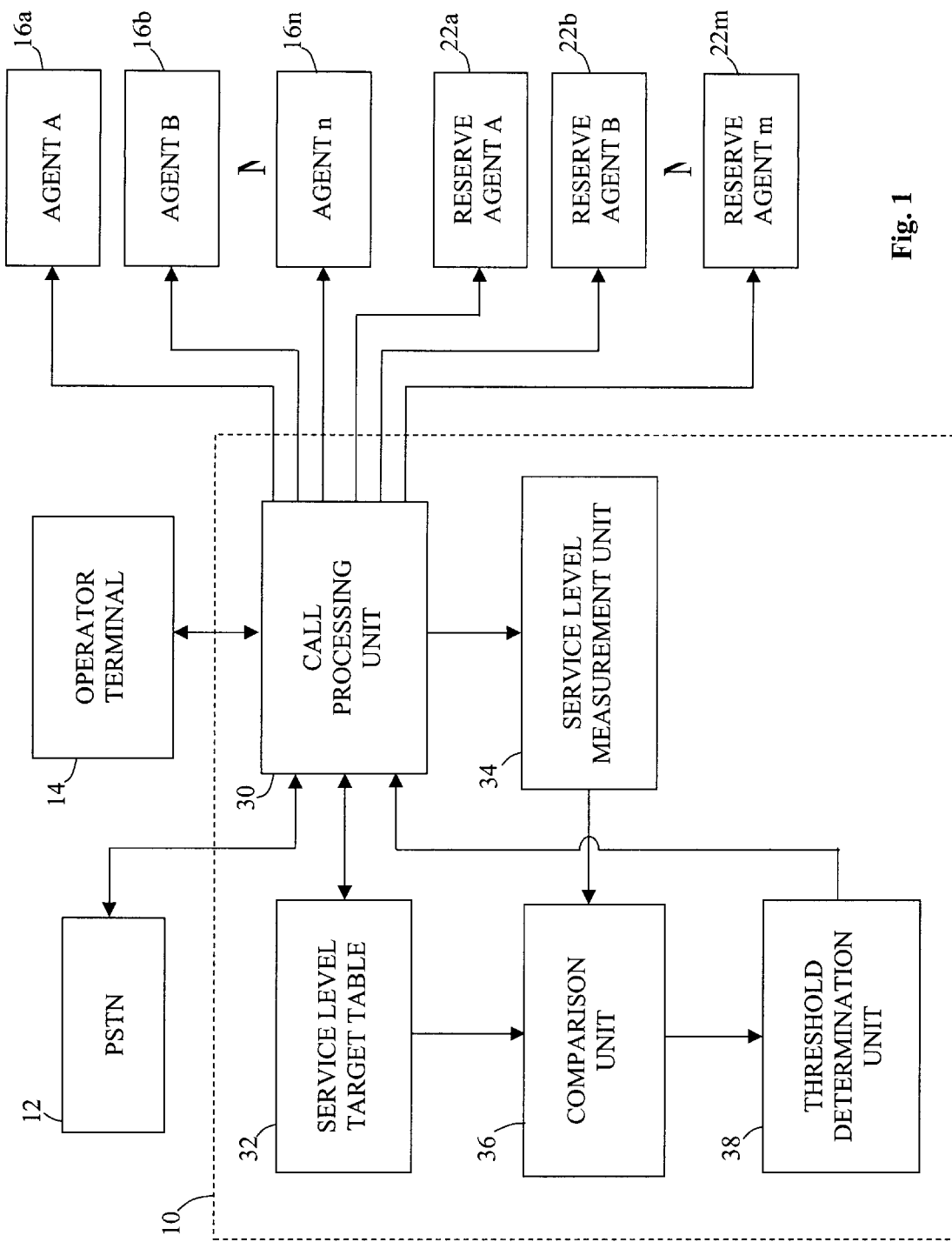
FIG. 1 is a block diagram illustrating a call center that is used to process incoming calls for an organization in accordance with one embodiment of the present invention.

FIG. 1 is a block diagram illustrating a call center 10 that is used to process telephone calls for an associated organization in accordance with one embodiment of the present invention. The call center 10 is coupled to a public switched telephone network (PSTN) 12 through which it receives calls from remote parties. The call center 10 is also coupled to an operator terminal 14 through which a call center operator can program and configure the call center functionality. In addition, the call center 10 is coupled to a plurality of agent stations 16a, 16b, . . . , 16n and a plurality of reserve agent stations 26a, 22b, . . . , 22m to which it directs calls during normal call center operations.

As illustrated in FIG. 1, the call center 10 includes: a call processing unit 30, a service level target table 32, a service level measurement unit 34, a comparison unit 36, and a threshold determination unit 38. The call processing unit 30 is operative for, among other things, receiving telephone calls from the PSTN 12 and for distributing the calls to the agent stations 16a, 16b, . . . , 16n and the reserve agent stations 26a, 22b, . . . , 22m to be handled by call center personnel located at these stations. The call processing unit 30 is also operative for keeping track of call center performance statistics and the like. The remainder of the elements within the call center 10 are used by the call processing unit 30 to determine how the incoming calls are to be distributed. It should be understood that the various blocks within the call center 10 of FIG. 1 are functional in nature and do not necessarily correspond to discrete hardware units. For example, two or more of the functional blocks can be implemented in software within a common digital processing unit.

The call center 10 is capable of handling a large number of different call types or "skills". In general, an individual skill can include any type of call that an organization wishes to differentiate from other call types, for whatever reason. For example, an organization may wish to differentiate between calls related to different product families offered for sale by the organization. Many other ways of defining skills within a call center are also possible. The call processing unit 30 can determine the skill associated with a particular incoming call in any of a number of different ways. For example, in one approach, a caller is presented with an audio menu through which he/she designates the skill associated with the corresponding call. In another approach, a unique telephone number is allocated to each different skill serviced by the call center 10. The call processing unit 30 thus determines the skill associated with a call based on the line through which the call was received. A hybrid approach using both audio menus and multiple phone numbers can also be used. As can be appreciated, many other techniques for determining the skill associated with each incoming call are possible.

In accordance with the present invention, each of the skills supported by the call center 10 is assigned a service level target value that is indicative of a level of service that the corresponding organization wishes to provide for that skill. These service level target values are stored within the service level target table 32. The service level target values can be specified and modified by a call center operator located at operator terminal 14. In a typical implementation, the service level target table 32 is stored within a mass storage device or semiconductor memory associated with the call processing unit 30.

In a preferred embodiment of the invention, each of the agents associated with the agent stations 16a, 16b, . . . , 16n are assigned a subset of skills that they are to service during normal call center operations. This subset of skills does not change during normal operation. The call processing unit 30 only distributes calls to an agent that fall within the agent's skill set. In one approach, for example, an individual call queue is maintained for each skill supported by the call center 10. A particular agent, therefore, draws calls from each of the queues within his/her skill set. Typically, when one of the agents in the call center becomes available, he/she will be allocated the oldest call that is in a first position of one of the queues corresponding to that agent.

The reserve agents associated with the reserve agent stations 26a, 22b, . . . , 22m are not assigned a particular set of skills to support during call center operation. Instead, the reserve agents are each assigned a changing set of skills based on system conditions. When a new call associated with a particular skill is received by the call center 10, the call processing unit 30 determines an "expected wait time" for the new call. The expected wait time represents an estimated time that a caller associated with the new call will have to wait before the call is addressed by call center personnel. If the expected wait time exceeds a threshold value, the call processing unit 30 assigns a reserve agent to the associated skill to facilitate the processing of calls for the skill. By providing an additional agent (i.e., a reserve agent) to handle calls for the skill, the expected wait times for queued calls within the skill are reduced.

Although the above discussion describes agents and reserve agents as separate entities, it should be appreciated that a single employee can act as an agent for some skills and a reserve agent for other skills from a single station in accordance with the invention. The call processing unit 30 keeps track of which employees are performing dual functions and distributes incoming calls accordingly. In addition, it should be appreciated that multiple threshold values can be maintained and dynamically adjusted for one or more of the skills in the call center in accordance with the present invention. For example, in one embodiment, call center employees are assigned as either level 1 or level 2 reserve agents. A level 1 reserve agent is activated for a skill when the expected wait time for the skill exceeds the level 1 threshold. A level 2 reserve agent is activated for the skill when the expected wait time for the skill exceeds the level 2 threshold. The level 2 threshold is always greater than or equal to the level 1 threshold.

In accordance with the present invention, the threshold value used by the call processing unit 30 to allocate a reserve agent to a skill is a dynamically varying amount. That is, the threshold value associated with a skill is repeatedly modified during system operation (e.g., at predetermined intervals) based on a measured service level being provided for the skill. In addition, in a preferred approach, the threshold value for the skill is varied based on how closely the measured service level for the skill tracks the service level target for the skill. The service level measurement unit 34 measures a present service level being provided for each of the skills. The comparison unit 36 then compares the measured service level for each skill to the service level target for the skill (recorded in the service level target table 32). The result of the comparison is then transferred to the threshold determination unit 38 which modifies a current threshold for the skill based on the comparison result. Thus, the threshold is changed if the service level target for the skill is not being accurately achieved. For example, in one approach, if the measured service level exceeds the service level target by greater than a predetermined amount, the threshold determination unit 38 increases the threshold level for the skill. Similarly, if the measured service level is less than the service level target by more than another predetermined amount, the threshold determination unit 38 decreases the threshold level for the skill. By increasing/ decreasing the threshold value for the skill, the threshold determination unit 38 is decreasing/increasing the likelihood that a reserve agent will be allocated to the skill. Correspondingly, the service level being provided for the skill will decrease/increase to a value that is closer to the service level target for the skill. The threshold adjustment process is preferably a periodic or continuous process within the call center for each skill.

In a preferred embodiment of the invention, the service level measurement unit 34 measures a weighted service level associated with each of the skills. The weighted service level for each skill is computed using an exponential moving average based on the expected wait time for that skill. The weighted service level for each skill is updated periodically (e.g., every 10 seconds). The expected wait time is based on the number of agents eligible to receive a call for a skill, the number of calls currently queued for the skill, and the weighted advance time for the skill. An agent is eligible to receive a call for a skill if the agent is available and is not reserved for that skill. The value passed to the exponential moving average is based on a ratio of the expected wait time and the administered target service level.

Figure 2:
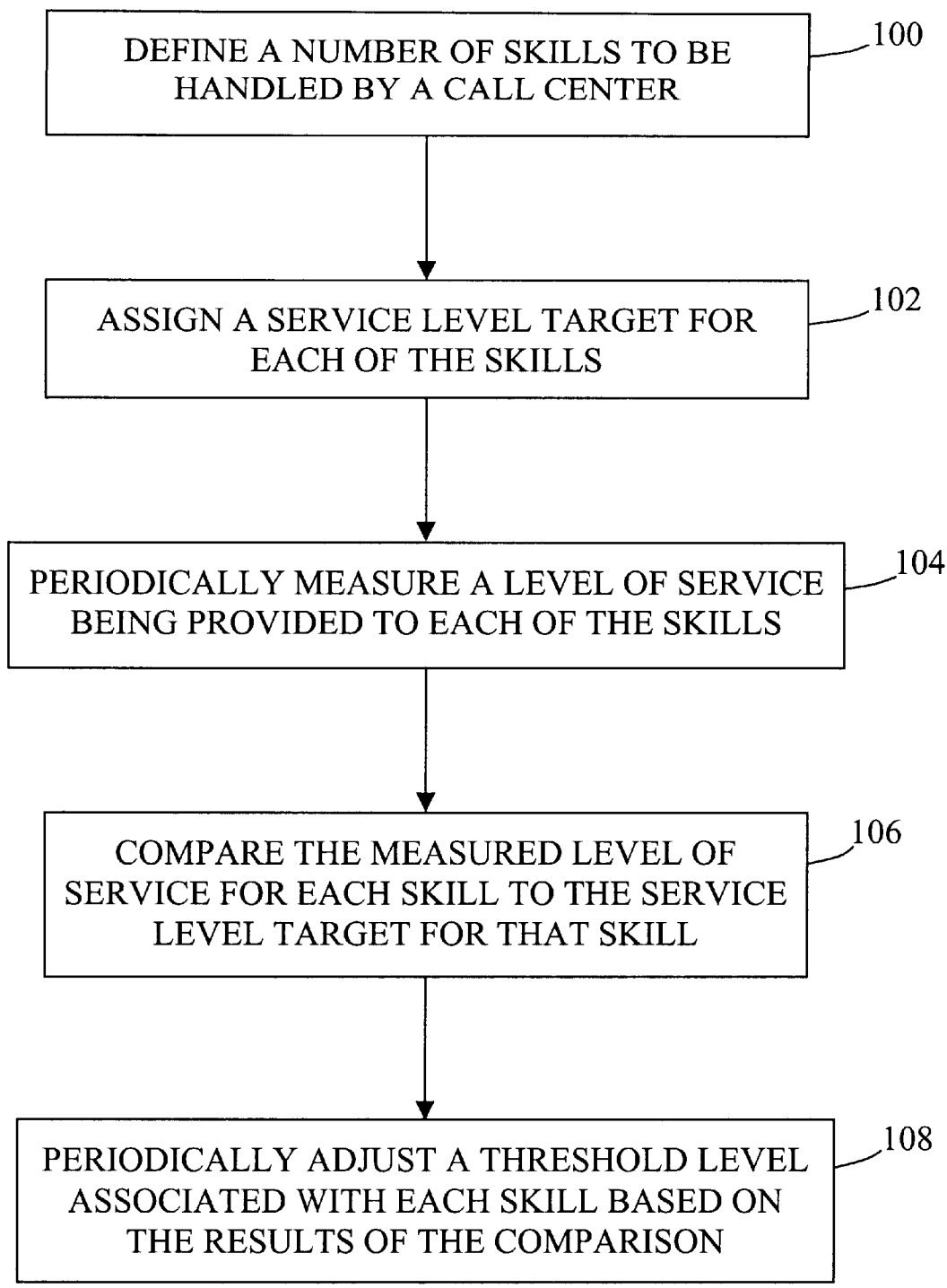
FIG. 2 is a flowchart illustrating a method for managing incoming calls within a call center in accordance with one embodiment of the present invention.

FIG. 2 is a flowchart illustrating a method for managing incoming calls within a call center in accordance with one embodiment of the present invention. First, a number of skills are defined that are to be handled by the call center (step 100). Next, a service level target is specified for each of the skills (step 102). A level of service being provided by the call center for each of the skills is periodically measured during call center operation (step 104). The level of service measured for each of the skills can include the weighted service level measurement discussed previously or any other service level measurement that can be used to gauge a quality of service being provided for a particular skill. The measured level of service for each skill is periodically compared to the service level target for that skill to generate a comparison result (step 106). The comparison can include, for example, calculating a difference between the two values or a ratio of the two values. Other comparison techniques can also be used. The threshold level for each of the skills is periodically adjusted during call center operation based on the corresponding comparison result (step 108). In one embodiment, the threshold level for each skill is adjusted every 60seconds.

Figure 3:
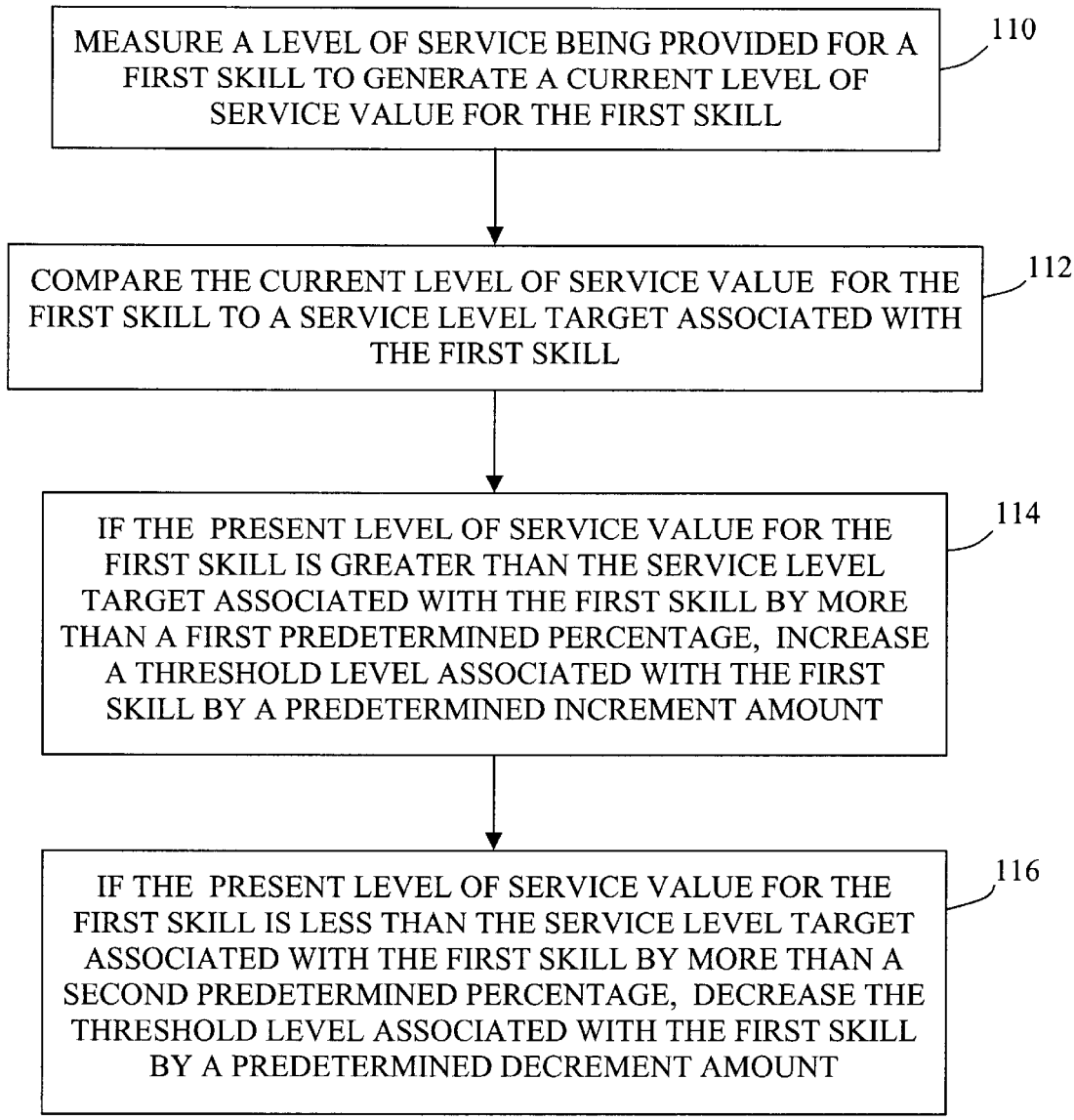
FIG. 3 is a flowchart illustrating a method for dynamically adjusting a threshold level associated with a first skill in a call center in accordance with one embodiment of the present invention.

FIG. 3 is a flowchart illustrating a method for dynamically adjusting a threshold level associated with a first skill in a call center in accordance with one embodiment of the present invention. A level of service associated with the first skill is first measured to generate a current level of service value for the first skill (step 110). The level of service measured for the first skill can include, for example, the weighted service level measurement discussed previously. The current level of service value for the first skill is then compared to a service level target associated with the first skill (step 112). The service level target for the first skill can be expressed as, for example, X percent of calls being answered within Y seconds. If the present level of service value for the first skill is greater than the service level target associated with the first skill by more than a first predetermined percentage (e.g., 5% of the service level target for the first skill), the threshold level associated with the first skill is increased by a predetermined increment amount (e.g., 1% of the current threshold level) (step 114). If the present level of service value for the first skill is less than the service level target associated with the first skill by more than a second predetermined percentage (e.g., 5% of the service level target for the first skill), the threshold level associated with the first skill is decreased by a predetermined decrement amount (e.g., 1% of the current threshold level) (step 116). The first and second predetermined percentage can be the same value or different values in accordance with a present invention. Likewise, the predetermined increment amount can be different from the predetermined decrement amount in accordance with the present invention. Other techniques for adjusting threshold level can also be used in accordance with a present invention. For example, techniques that adjust the threshold level by an amount that is related to the difference between or ratio of the measured service level and the service level target for a skill can also be used.

The above-described methods can also be implemented within a system that utilizes multiple threshold values for one or more skills. In addition, the different threshold values for a particular skill can be adjusted independently using different percentage deltas. For example, in one embodiment, the level 1 threshold for a skill is increased if the weighted service level is more than 6% above the service level target and is decreased if the weighted service level is more than 1% below the target. The level 2 threshold for the skill is increased if the weighted service level is more than 1 above the service level target and is decreased if the weighted service level is more than 6% below the target. In this manner, the level 1 and level 2 thresholds are adjusted such that the level 2 threshold is greater than the level 1 threshold even if they are initially assigned the same value.

Although the present invention has been described in conjunction with its preferred embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method for managing incoming calls in a call center, comprising:
    (a) providing, from a plurality of agents, a first subgroup of agents assigned to service call types in a first set of call types and a second subgroup of agents assigned to service call types in a second set of call types, wherein at least one member of the first and second sets of call types is different and at least one member of the first and second subgroup of agents is different, and wherein each of the first and second sets of call types has a corresponding predetermined service level target;
    (b) determining a first level of service being provided to the first set of call types;
    (c) comparing the first level of service with a first service level target corresponding to the first set of call types;
    (d) when the first level of service exceeds the first service level target, increasing a first threshold value associated with the first set of call types;
    (e) when the first level of service does not exceed the first service level target, decreasing the first threshold value;
    (f) determining a first wait time associated with the first types of calls;
    (g) comparing the first wait time with the first threshold value; and
    (h) assigning an additional agent to the first subgroup of agents when the first wait time exceeds the first threshold value.

2. The method of claim 1, further comprising:
    (i) removing an agent from the first subgroup of agents when the first wait time is less than the first threshold value.

3. The method of claim 2, further comprising a plurality of reserve agents, each of said plurality of reserve agents being assignable to any of a plurality of sets of call types, and wherein, in step (i), the removed agent is assigned to the plurality of reserve agents.

4. The method of claim 1, further comprising a plurality of reserve agents, each of said plurality of reserve agents being assignable to any of a plurality of sets of call types, and wherein, in step (h), the additional agent is a reserve agent.

5. The method of claim 1, wherein the service level target specifies a quantity of calls to be routed to an agent for servicing within a specified time period.

6. The method of claim 5, wherein the level of service is computed using an exponential moving average based on a ratio of the first wait time and the quantity of calls specified in the service level target.

7. The method of claim 1, wherein the first wait time is an expected wait time associated with a first call in the first set of call types.

8. The method of claim 1, wherein step (d) is performed only when the the first level of service exceeds the first service level target by a predetermined amount.

9. The method of claim 1, wherein step (e) is performed only when the the first level of service is less than the first service level target by a predetermined amount.

10. The method of claim 1, wherein, in step (d), the first threshold value is increased by a selected amount, and, in step (e), the first threshold value is decreased by the selected amount.

11. The method of claim 1, wherein steps (b) and (f) are each performed one of periodically and continually.

12. A computer readable medium comprising executable instructions to perform the steps of claim 1.

13. The method of claim 1, wherein each agent has a corresponding set of skills and wherein each agent in the first subgroup of agents has a common first skill and each agent in the second subgroup of agents has a common second skill different from the first skill and wherein the first set of call types corresponds to the first skill and the second set of call types corresponds to the second skill.

14. A method for managing incoming calls in a call center having a plurality of assigned agents and a plurality of reserve agents, said incoming calls having a plurality of different call types, each of said plurality of assigned agents being assigned to service a specific set of call types while said plurality of reserve agents are assignable to any of a plurality of sets of call types, comprising:

(a) providing, from the plurality of agents, a first subgroup of assigned agents assigned to service call types in a first set of call types and a second subgroup of assigned agents assigned to service call types in a second set of call types, wherein at least one member of the first and second sets of call types is different and at least one member of the first and second subgroup of agents is different, and wherein each of the first and second sets of call types has a corresponding predetermined service level target;

(b) determining a first level of service being provided to the first set of call types;

(c) comparing the first level of service with a first service level target corresponding to the first set of call types;

(d) when the first level of service exceeds the first service level target, increasing a first threshold value associated with the first set of call types;

(e) when the first level of service does not exceed the first service level target, decreasing the first threshold value;

(f) determining a first wait time associated with the first types of calls;

(g) comparing the first wait time with the first threshold value; and (h) assigning a reserve agent to the first subgroup of agents when the first wait time exceeds the first threshold value.

15. The method of claim 14, further comprising:

(i) removing an assigned agent from the first subgroup of agents and assigning the assigned agent to the plurality of reserve agents, when the first wait time is less than the first threshold value.

16. The method of claim 14, wherein the service level target specifies a quantity of calls to be routed to an agent for servicing within a specified time period.

17. The method of claim 16, wherein the level of service is computed using an exponential moving average based on a ratio of the first wait time and the quantity of calls specified in the service level target.

18. The method of claim 14, wherein the first wait time is an expected wait time associated with a first call in the first set of calltypes.

19. The method of claim 14, wherein step (d) is performed only when the the first level of service exceeds the first service level target by a predetermined amount.

20. The method of claim 14, wherein step (e) is performed only when the the first level of service is less than the first service level target by a predetermined amount.

21. The method of claim 14, wherein, in step (d), the first threshold value is increased by a selected amount, and, in step (e), the first threshold value is decreased by the selected amount.

22. The method of claim 14, wherein steps (b) and (f) are each performed one of periodically and continually.

23. A computer readable medium comprising executable instructions to perform the steps of claim 14.

24. The method of claim 14, wherein each assigned agent has a corresponding set of skills and wherein each assigned agent in the first subgroup of agents has a common first skill and each assigned agent in the second subgroup of agents has a common second skill different from the first skill and wherein the first set of call types corresponds to the first skill and the second set of call types corresponds to the second skill.

25. A call center comprising:

(a) a call processing unit operable to receive and distribute calls among a plurality of agent stations based on call type, wherein a first subgroup of agent stations is assigned to service call types in a first set of call types and a second subgroup of agent stations is assigned to service call types in a second set of call types, wherein at least one member of the first and second subgroup of agents is different, and wherein each of the first and second sets of call types has a corresponding predetermined service level target value indicating a desired service level to be achieved for a corresponding call type;

(b) a service level target table associated with said call processing unit operable to store the service level target value for each of said plurality of call types, wherein the first set of call types corresponds to a first service level target value;

(c) a service level measurement unit operable to measure a level of service being provided by said call center for each of said plurality of call types, wherein the first set of call types corresponds to a first level of service;

(d) a comparison unit, coupled to the service level measurement unit and the service level target table, operable to compare the first level of service with the first service level target value;

(d) a threshold generation unit operable to (i), when the first level of service exceeds the first service level target value, increase a first threshold value associated with the first set of call types and (ii), when the first level of service does not exceed the first service level target value, decrease the first threshold value, wherein the call processing unit is further operable to compare the first wait time with the first threshold value and assign an additional agent to the first subgroup of agents when the first wait time exceeds the first threshold value.

26. The call center of claim 25, wherein the call processing unit is further operable to remove an agent to the first subgroup of agents when the first wait time is less than the first threshold value.

27. The call center of claim 26, wherein the agent is removed only when the first level of service is less than the first service level target by a predetermined amount.

28. The call center of claim 25, further comprising a plurality of reserve agents, each of said plurality of reserve agents being assignable to any of a plurality of sets of call types, and the assigned additional agent is a reserve agent.

29. The call center of claim 26, further comprising a plurality of reserve agents, each of said plurality of reserve agents being assignable to any of a plurality of sets of call types, and wherein the call processing unit assigns the removed agent to the plurality of reserve agents.

30. The call center of claim 25, wherein the service level target value specifies a quantity of calls to be routed to an agent for servicing within a specified time period.

31. The call center of claim 30, wherein the level of service is computed using an exponential moving average based on a ratio of the first wait time and the quantity of calls specified in the service level target value.

32. The call center of claim 25, wherein the first wait time is an expected wait time associated with a first call in the first set of call types.

33. The call center of claim 25, wherein the additional agent is assigned only when the first level of service exceeds the first service level target by a predetermined amount.

34. The call center of claim 25, wherein in operation (i) the first threshold value is increased by a selected amount, and in operation (ii) the first threshold value is decreased by the selected amount.

35. The call center of claim 25, wherein operations (i) and (ii) are performed one of periodically and continually.

36. The call center of claim 25, wherein said service level measurement unit includes an agent operable to generate an exponential moving average for each of said plurality of call types based on an expected wait time of each corresponding call type to generate a weighted service level for each of said plurality of call types.

37. The call center of claim 25, wherein said comparison unit is operable to determine a ratio between said measured service level and said service level target value for each of said plurality of call types.

38. The call center of claim 25, wherein each agent has a corresponding set of skills and wherein each agent in the first subgroup of agents has a common first skill and each agent in the second subgroup of agents has a common second skill different from the first skill and wherein the first set of call types corresponds to the first skill and the second set of call types corresponds to the second skill.

* * * * *